Figure 1:
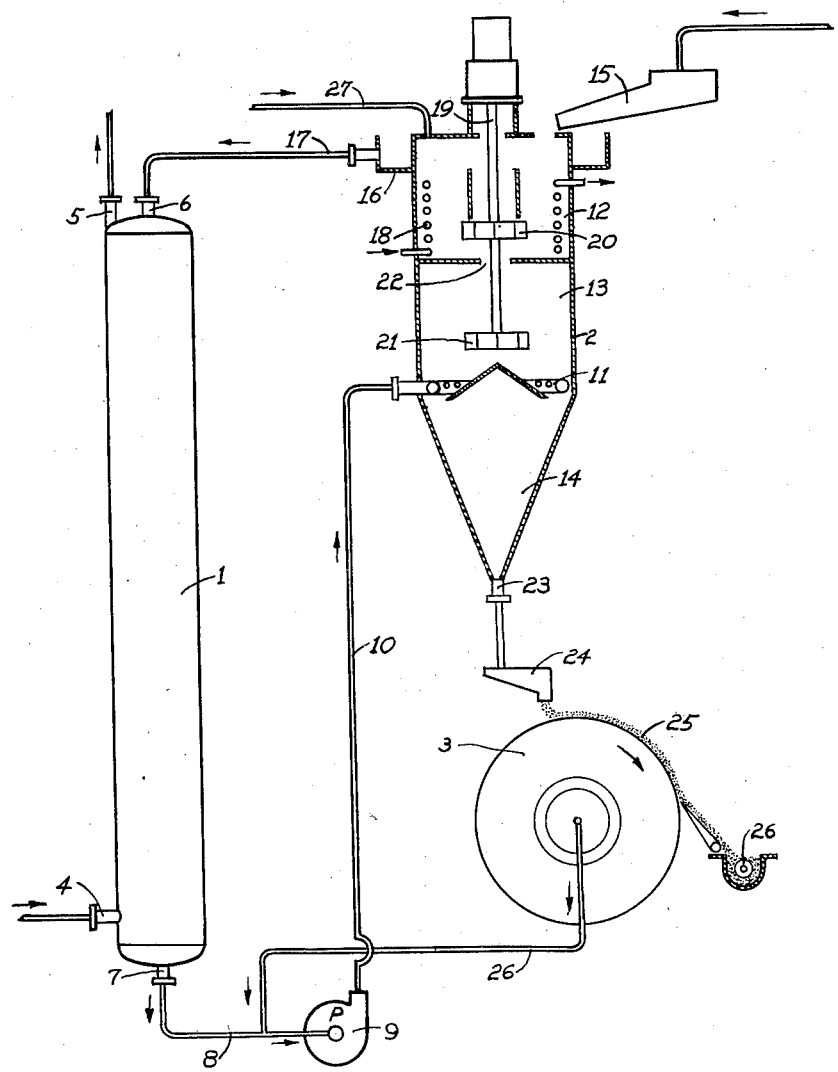

April 12, 1949.  J. R. SHIELDS ET AL  2,467,274
PROCESS AND APPARATUS FOR RECOVERING IN THE FORM
OF ALKALI METAL SALTS THE OXIDES OF NITROGEN
FROM GASES CONTAINING THE SAME Filed May 23, 1945  2 Sheets-Sheet 1

INVENTORS
James R. Shields and
Herbert L. Barnebey
BY
Stebbins, Blenko + Webb
ATTORNEYS Patented Apr. 12, 1949

2,467,274

UNITED STATES PATENT OFFICE 2,467,274

PROCESS AND APPARATUS FOR RECOVERING IN THE FORM OF ALKALI METAL SALTS THE OXIDES OF NITROGEN FROM GASES CONTAINING THE SAME

James R. Shields, Pittsburgh, and Herbert L. Barnebey, Oakmont, Pa., assignors to Blaw-Knox Company, Pittsburgh, Pa., a corporation of New Jersey Application May 23, 1945, Serial No. 595,278

4 Claims. (Cl. 23—102)

This invention relates to process and apparatus for recovering in the form of alkali metal salts the oxides of nitrogen from gases containing the same. It relates more particularly to the production of alkali metal nitrite as, for example, sodium or potassium or lithium nitrite from gases containing oxides of nitrogen. It is known that a solution of sodium nitrite may be made by contacting gases containing NO and $NO_2$ with sodium hydroxide or sodium carbonate solutions. The sodium nitrite is then recovered from the solution by evaporation and crystallization.

The present invention provides a method and apparatus for the recovery of sodium nitrite or other alkali metal-nitrogen containing salts from solutions of the same without requiring evaporation of the liquor containing these salts. For simplicity we will refer to the recovering of sodium nitrite, it being understood that other alkali metal nitrites or nitrates may be recovered in a similar manner by using other alkali metals than sodium and by controlling the proportion of NO and $NO_2$ in the gas which is treated.

In accordance with our process, gases containing oxides of nitrogen, either NO or $NO_2$, or a mixture of both, are contacted with an aqueous alkaline absorption liquor such, for example, as a solution of sodium hydroxide or other alkali metal hydroxides so as to produce a solution of alkali metal nitrogen containing salt. This step may be carried out in a known manner. Instead of recovering the alkali metal nitrogen containing salt from its solution by evaporation of the solution and crystallization in a previously known manner, in accordance with the present invention the alkali metal nitrogen containing salt is precipitated from its solution by adding to the solution alkali metal hydroxide in amount sufficient to raise the concentration of alkali metal hydroxide above the saturation point of the alkali metal nitrogen containing salt. This step may be termed a "salting out" operation. The precipitated alkali metal nitrogen containing salt is then separated by filtering, centrifuging, or other suitable methods, and the precipitate is dried and further treated if desired.

The precipitation of the sodium nitrite from its solution has many advantages as compared with the known methods of evaporation and crystallization. In the evaporation method, impurities are left behind with the sodium nitrite when the water is evaporated off. The impurities are believed to be decomposition products of $NaNO_3$ and these impurities are strongly colored, either brown or yellow. In the evaporation method there is considerable tendency to form these decomposition products and since they are left behind with the sodium nitrite, they color the product. In our precipitation process the addition of sodium hydroxide to the sodium nitrite solution removes the color and makes the solution water-white so that the precipitate is white. The evaporation method tends to produce large crystals or clumps of crystals, whereas the precipitation method of the present invention results in more nearly uniform crystal size, and the crystal size can be controlled by the rate of addition of sodium hydroxide to the sodium nitrite solution.

In addition to the improved purity of product, the precipitation process dispenses with the necessity for evaporators and crystallizers, thereby lowering the initial cost and upkeep of the apparatus. The process also is simpler and therefore more economical.

In carrying out the process, the sodium hydroxide solution used for absorbing the oxides of nitrogen preferably has an initial concentration of about 15 to 35%. Solutions having a concentration higher than 35% are usually unsuitable because of their high viscosity. A preferred concentration of sodium hydroxide is about 25%. The absorption liquor is circulated through the absorber in contact with the gases until the liquor is "spent." While theoretically it would be possible to absorb some oxides of nitrogen so long as the absorption liquor has some causticity, in actual commercial practice a desirable minimum causticity is within the range of about 0.25% to 5%. Generally the absorption liquor is circulated in contact with the gases until the causticity of the liquor has been reduced to about 1%. The sodium nitrite is then precipitated from the spent solution by adding sodium hydroxide in amount sufficient to raise the concentration above the saturation point of sodium nitrite. The amount of caustic added in regenerating the spent absorption liquor is preferably such as to bring its causticity back to its initial causticity, i. e., to a concentration of about 15 to 35%. The precipitated sodium nitrite is then separated from the mother liquor by any suitable means.

Figure 2:
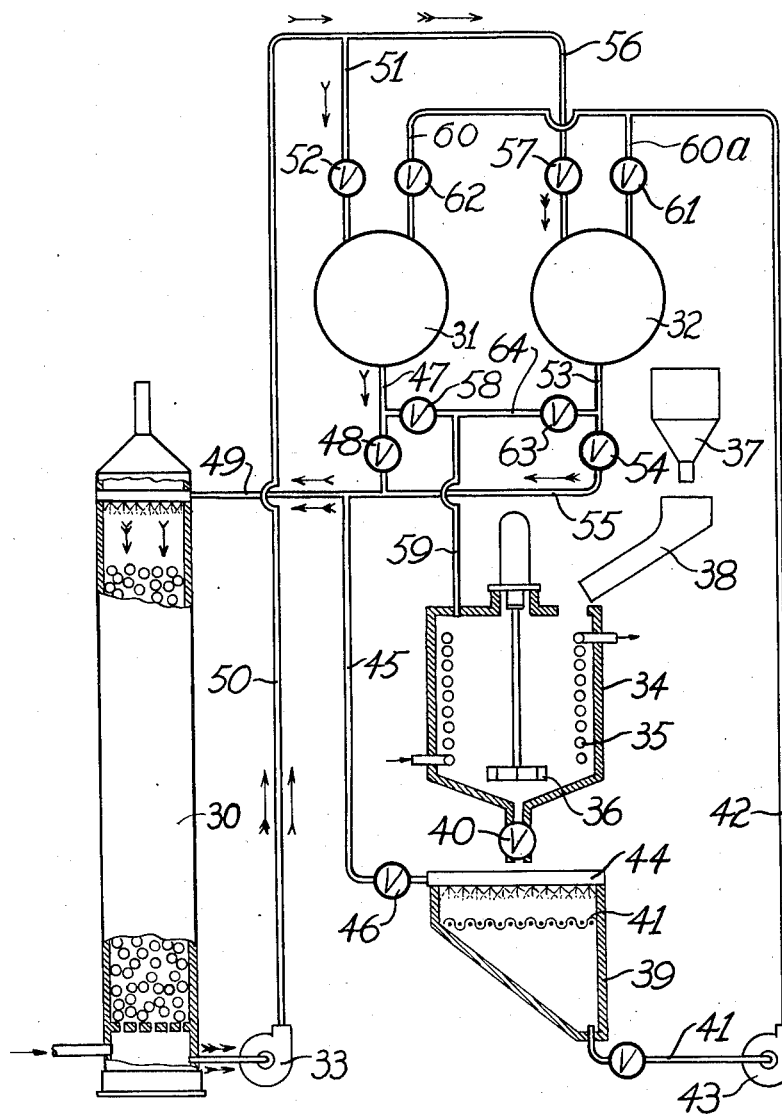

In the accompanying drawings, which illustrate present preferred embodiments of the invention, Figure 1 is a diagrammatic illustration of a continuous process, and Figure 2 is a diagrammatic illustration of a batch process in which the absorption step is carried out continuously and the regeneration of the spent absorption liquor is carried out intermittently.

Referring to the continuous process illustrated in Figure 1, the apparatus consists of at least three major elements, an absorber 1, a regenerator 2 and a filter 3. The absorber 1 has a gas inlet 4 for gases containing oxides of nitrogen, a gas outlet 5, an absorption liquor inlet 6 and a spent liquor outlet 7. This absorber may be of any conventional type, as a packed column or bubble tower, of sufficient capacity to remove all oxides of nitrogen from the gas stream and produce a spent liquor of low causticity, say about one per cent, and high concentration of nitrogen containing salts; say about twenty-five per cent. The difficulty is not so much in scrubbing the gas stream as in obtaining a spent liquor of desired concentration in one passage through the absorber and in practice, either a very high tower, or probably two or more towers in series, may be required. The spent liquor flows from the bottom of the absorber 1 through pipe 8 and is pumped by pump 9 through pipe 10 and delivered by a nozzle 11 into the regenerator 2. The regenerator is constructed in three sections in which section 12 is the causticizing section, section 13 is the washing section and section 14 is the thickening section. Caustic may be added to section 12 by a feeder 15. The section 12 also has an overflow 16 which returns regenerated absorption liquor to the top of the absorber 1 through pipe 17. The section 12 is provided with cooling coils 18. A stirrer having a drive shaft 19 and blades 20 and 21 agitates the liquor in sections 12 and 13.

The addition of caustic to the spent absorption liquor in section 12, coupled with agitation and cooling, causes precipitation of sodium nitrite. The precipitate passes downwardly through the opening 22 between the sections 12 and 13 and in its downward passage through section 13 is washed by the flow of spent absorption liquor discharged from the nozzle 11. The spent absorption liquor, after washing the sodium nitrite precipitate, passes upwardly through the opening 22 into section 12, where caustic is added. The regenerated absorption liquor overflows into trough 16 and is returned by pipe 17 into the top of the absorber. In section 14 the liquor is quiescent and the precipitated sodium nitrite crystals settle to the bottom and are discharged as a thickened slurry to a trough 24 and rotary filter 3. The washed crystals 25, discharged from the filter, are removed by a conveyor 26 to storage not shown, or if desired, to further processing steps such as a drier. The filtrate from the filter 3 is returned through pipe 26, pump 9 and pipe 10 to the regenerator 2. Make-up water may be added to the regenerator as required, as indicated by the arrow 27.

Reference is now made to Figure 2 which illustrates a process in which the absorption step may be carried out continuously and the regeneration of the spent absorption liquor is carried out intermittently. This arrangement of apparatus provides that the absorption liquor may be circulated many times through the absorber and thereby be brought to economical concentration of nitrogen containing salts and reduced in causticity to a very low value in an absorber of relatively small dimensions.

Referring to Figure 2, reference numeral 30 indicates an absorption tower or absorber. This may be a bubble tower, packed column, or other suitable gas and liquid contact device. Commonly a tower packed with Raschid rings is used for absorbing oxides of nitrogen from gases. Reference numerals 31 and 32 designate absorption liquor batch tanks and reference numeral 33, a liquor circulating pump. In normal operation, the batch in one of the tanks 31 or 32 is circulated through the absorber 30, becoming more concentrated in nitrogen containing salts, while a previously used and now spent batch from the other tank is being treated in a regenerator with sodium hydroxide to precipitate the nitrogen containing salts from solution and to increase the concentration of sodium hydroxide so that it is suitable for being passed through the absorber to absorb more oxides of nitrogen.

A regenerator 34 is provided in which the spent liquor which is low in causticity and high in concentration of nitrogen containing salts in solution is regenerated by the addition of sodium hydroxide, thereby restoring the causticity of the solution and precipitating the nitrogen containing salts. The spent batch of absorption liquor from one of the tanks 31 or 32 (the tank which is not in circuit with the absorber at the moment) is emptied into the regenerator 34 wherein it is held, agitated and cooled while solid or at least quite concentrated caustic is added to the liquor. When this treatment is completed, the regenerator contains a dispersed solid phase of nitrogen containing salts in a regenerated absorption liquor of proper caustic concentration for effective extraction of oxides of nitrogen from the gases in the absorber 30. The regenerator 34 is provided with cooling coils 35 and a stirrer 36. Caustic is added to the regenerator from a measuring hopper 37 through a feeder 38 which conveniently may be a vibratory feeder.

Reference numeral 39 designates a washing filter or separator in which nitrogen containing salts are separated from the caustic liquor. After precipitation of the nitrogen containing salts has been carried out in the regenerator 34 to the desired extent, the contents of the regenerator is discharged through the outlet 40 on to the screen 41. The filtrate from the separator 39 is returned to the system through pipes 41 and 42 by a pump 43. The separator 39 is provided with a washing spray 44 and in carrying out the washing, spent liquor is fed through the pipe 45 controlled by valve 46 to the spray 44. The separator 39 may be of any convenient type and includes (besides the filtering screen and washing spray) a means, not shown, for removing the washed crystals of nitrogen containing salts from the screen.

Piping may be conveniently arranged as shown and the tanks 31 and 32 set at suitable elevations to provide gravity flow to and through the other apparatus. Of course, if in any particular installation the elevated position of the tanks is objectionable for practical reasons, the tanks may be actually set where desired and supplementary pumps provided as required, to effect such flow, if in any case gravity flow cannot be or is not, in fact, provided. The piping is provided with suitable valves as shown for controlling the flow of materials through the system. The operation of the process with the apparatus shown in Figure 2 is as follows:

Assume at the beginning of the operation that tanks 31 and 32 each contains a batch of caustic liquor as, for example, a 25% solution of caustic soda; that pump 33 is running; that valves 52 and 48 are open and valves 62 and 58 are closed; and that gases containing nitrogen oxides are passed upwardly through the absorber 30, the liquor passing downwardly through the packing counter-current to the gases. The flow of liquor in the circuit including the tank 31 and absorber 30 is indicated by the single tail arrows. The liquor flows from tank 31 through pipe 47, valve 48, and pipe 49 into the top of the absorber 30. From the bottom of the absorber, the liquor is returned by pump 33, pipe 50, pipe 51 through valve 52 and returned to the tank 31. This process is continued to the desired extent whereupon (valves 61 and 63 being closed) valves 52 and 48 are closed and valves 57 and 54 are opened, switching the absorber 30 to the liquor from tank 32. The flow of liquor between the tank 32 and absorber 30 is indicated by the double tail arrows. The liquor flows from tank 32 through pipe 53 controlled by valve 54, pipes 55 and 49, into the top of the absorber. From the bottom of the absorber it is pumped by the pump 33 through pipe 50 and pipe 56 controlled by valve 57 and returned to the tank 32.

While the tank 32 is in circuit with the absorber, valve 58 is opened and the contents of tank 31 is delivered through pipe 47, valve 58 and pipe 59 to the regenerator 34. Caustic is added to the spent liquor in the regenerator and the liquor is cooled and agitated, thereby precipitating nitrogen containing salts from the liquor and increasing the concentration of the causticity of the liquor to a point where it is suitable for absorbing oxides of nitrogen from gases. Valve 40 is then opened, delivering the slurry to the separator 39. The caustic enriched effluent from the separator is then returned by pump 43 through pipes 41, 42, and pipe 60 controlled by valve 62 to the tank 31. Tank 31 is thus filled with concentrated absorption liquor suitable for use in the absorber 30. The nitrogen containing salts on the screen 41 are then washed by opening valve 46. Preferably, these operations are so timed that the absorption liquor fed through pipe 45 and valve 46 for washing the precipitate on the screen is then relatively rich in dissolved nitrogen containing salts so that the precipitate being washed is not readily dissolved therein. Such salts as are dissolved in the wash liquor are not lost however, as the wash liquor is returned to tank 32 by pump 43 through pipes 41, 42, 60a and valve 61, which is then open.

When the liquor in tank 32 has become spent, i. e., has been enriched in nitrogen containing salts in solution to the desired extent, valves 57 and 54 are closed and the absorber is switched to use regenerated liquor from tank 31 by opening valves 52 and 48 and closing valves 62 and 58. The liquor in tank 32 is then drained to the regenerator upon opening valve 63 to allow the liquor to pass through pipes 64 and 59. The spent liquor is treated with caustic in the regenerator as previously described so as to regenerate it and precipitate nitrogen containing salts which are then filtered and washed.

The invention is not limited to the preferred embodiments but may be otherwise embodied or practiced within the scope of the following claims.

We claim:

1. The process of recovering in the form of alkali metal nitrites the oxides of nitrogen from gases containing the same, which comprises contacting the gases with an aqueous alkali metal hydroxide absorption liquor, thereby producing a spent absorption liquor having a substantially reduced caustic concentration and containing alkali metal nitrite in solution, adding alkali metal hydroxide to the spent absorption liquor to substantially increase its caustic concentration and to precipitate alkali metal nitrite therefrom, separating the mother liquor from the precipitate and contacting the mother liquor with gases containing oxides of nitrogen for further absorption of said oxides.

2. The process of recovering in the form of alkali metal nitrites the oxides of nitrogen from gases containing the same, which comprises contacting the gases with an aqueous alkali metal hydroxide absorption liquor, thereby producing a spent absorption liquor having a substantially reduced caustic concentration and containing alkali metal nitrite in solution, adding alkali metal hydroxide to the spent absorption liquor to substantially increase its caustic concentration and to precipitate alkali metal nitrite therefrom, separating the mother liquor from the precipitate, washing the precipitate with spent absorption liquor, recovering the wash liquor, combining the mother liquor and wash liquor and contacting the combined liquors with gases containing oxides of nitrogen for further absorption of said oxides.

3. The process of recovering in the form of alkali metal nitrites the oxides of nitrogen from gases containing the same, which comprises contacting the gases with an aqueous alkali metal hydroxide absorption liquor having an initial concentration of about 15 to 35% until a spent absorption liquor containing not over 5% caustic and containing alkali metal nitrite in solution is produced, adding alkali metal hydroxide to the spent absorption liquor to increase its caustic concentration to about 15 to 35% and to precipitate alkali metal nitrite therefrom, separating the mother liquor from the precipitate, and contacting the mother liquor wtih gases containing oxides of nitrogen for further absorption of said oxides.

4. Apparatus for recovering in solid form a liquid absorbable constituent from gases, which comprises in combination an absorber for contacting the gases and absorption liquor, a regenerator for regenerating spent absorption liquor and precipitating solids therefrom, a separator for separating solids and liquids, two absorption liquor holding tanks, conduits for circulating absorption liquor from either one of said tanks through said absorber and back to said tank, conduits for discharging spent absorption liquor from either one of said tanks to the regenerator, means for discharging the contents of the regenerator to the separator, conduits for returning regenerated absorption liquor from the separator to either of said tanks and means in said several conduits for alternately connecting each tank in circuit with said absorber and for alternately connecting each tank in circuit with said regenerator and separator, whereby said absorber is operated continuously and the absorption liquor is regenerated and separated from the solid product in batches.

JAMES R. SHIELDS.
HERBERT L. BARNEBEY.

REFERENCES CITED

The following references are of record in the file of this patent:

UNITED STATES PATENTS

| Number | Name | Date |
|---|---|---|
| 871,640 | Schonherr et al. | Nov. 19, 1907 |
| 1,787,078 | Little | Dec. 30, 1930 |
| 2,191,467 | Haywood | Feb. 27, 1940 |
| 2,204,777 | Smith | June 18, 1940 |